Figure 1:
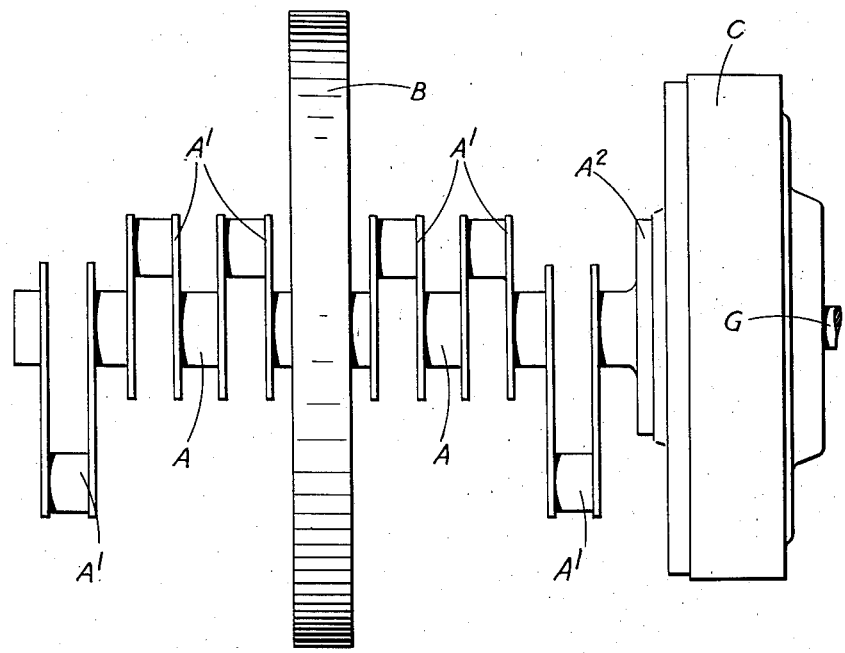

June 24, 1930.  H. R. RICARDO  1,767,309
MULTICYLINDER RECIPROCATING ENGINE
Filed Aug. 6, 1928  2 Sheets-Sheet 1

INVENTOR
Harry R. Ricardo
By Watson, Cait, Thoren & Grindle
Attys

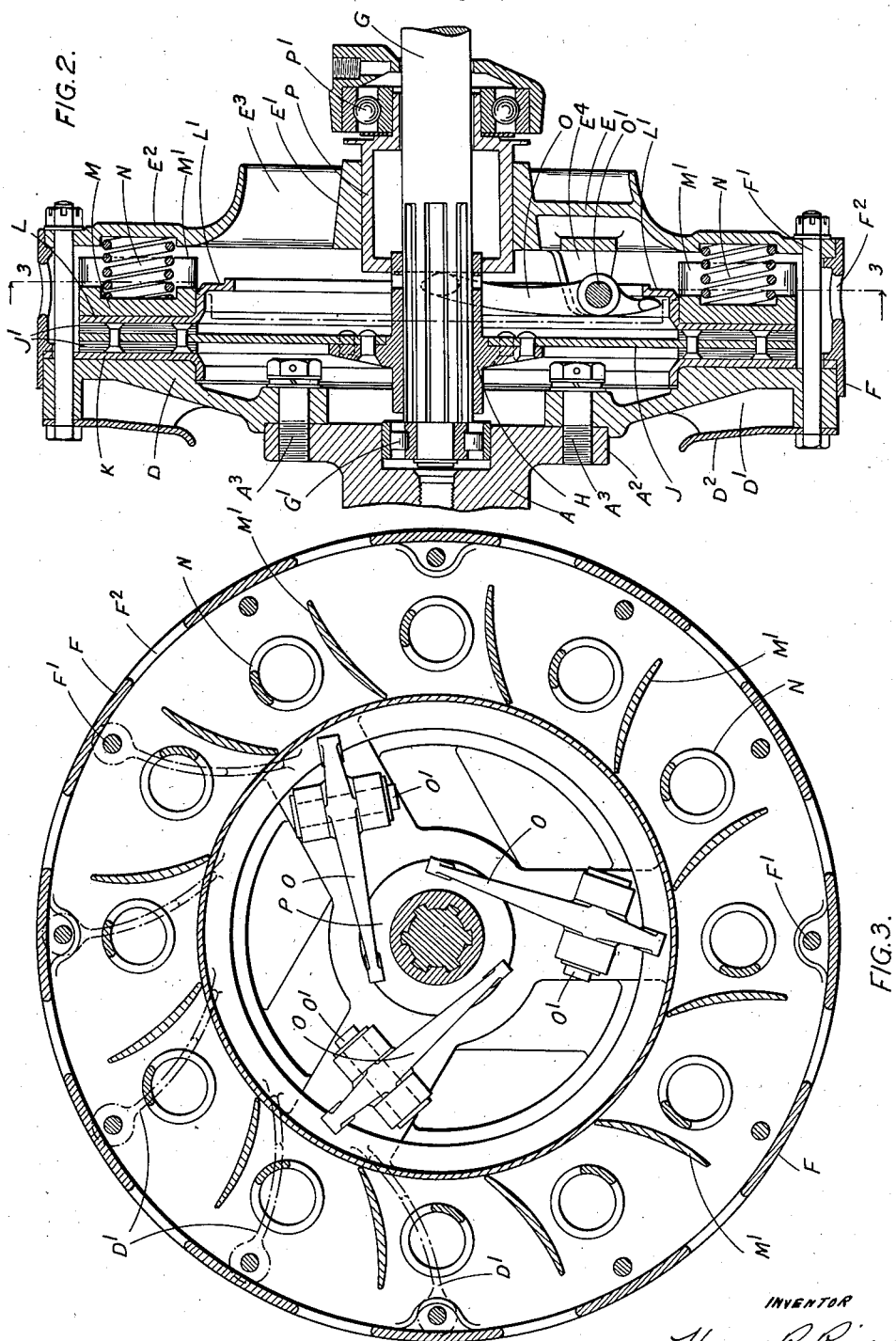

Patented June 24, 1930

1,767,309

UNITED STATES PATENT OFFICE

HARRY RALPH RICARDO, OF LONDON, ENGLAND

MULTICYLINDER RECIPROCATING ENGINE

Application filed August 6, 1928, Serial No. 297,788, and in Great Britain September 20, 1927.

This invention relates to multi-cylinder reciprocating engines of the kind having a multi-throw crankshaft to one end of which a friction clutch is secured and has for its object to render the crankshafts of such engines less liable to torsional oscillation.

For the purpose of attaining the above object, engines have previously been constructed with the flywheel located in the centre of the crankshaft, thus reducing the effective vibrating length of the shaft to about half its total length. In order to ensure that the natural frequency of the shaft or of that part of it which lies between the central flywheel and the clutch shall not come within the working speed range of the engine, it is essential however that the inertia of the clutch shall be as small as possible in relation to the flywheel.

In the case of commercial vehicles and particularly passenger carrying vehicles running on urban routes, the frequent stopping and starting of the vehicle under heavy load results in the development of considerable heat in the clutch. In those cases, therefore, where a centrally placed flywheel is employed on a heavily loaded vehicle, the problem arises of providing a clutch which shall be capable of dissipating considerable quantities of heat and yet shall have small inertia.

According to the present invention the flywheel is placed otherwise than at the end of the crankshaft so that it has one or more cranks on each side of it while the transmission clutch, which is mounted on the end of the crankshaft from which the drive is taken, is formed mainly or wholly of some metal such as aluminium or magnesium or their alloys having good heat conducting properties and low specific gravity and is provided with means embodied in the structure thereof whereby the rotation of the clutch induces a flow of air over parts adjacent to the friction surfaces. Thus, the clutch is conveniently formed with vanes so as to act as a fan to circulate air over and around the desired parts. In this way the clutch has good heat dissipating properties and yet a relatively small moment of inertia whereby torsional oscillation of the crankshaft tends to be prevented while an efficient clutch capable of standing up to hard usage is provided.

It is usually preferable to locate the flywheel in the centre of the crankshaft, i. e. with a similar number of cranks on each side thereof, but in some cases when the shaft has a large number of cranks, the flywheel may be disposed otherwise than in the centre thereof and so that the natural frequency of oscillation of the part of the crankshaft assembly on the clutch side of the flywheel is approximately equal to that of the part of the crankshaft on the other side thereof. Torsional vibration dampers of some known type may be provided at the free end of the crankshaft if desired.

Further, the clutch, while being formed mainly of aluminium may be provided with rubbing surfaces constituted by steel or like plates or facings.

The invention may be carried into practice in various ways but one crankshaft assembly for use in an engine according to this invention is illustrated by way of example in the accompanying drawings, in which Figure 1 is a side elevation of the complete crankshaft assembly, Figure 2 is a section on an enlarged scale through the axis of the clutch shown in Figure 1, and Figure 3 is a section on the line 3—3 of Figure 2.

In the construction illustrated the crankshaft A which is of the six-throw type carries between the third and fourth cranks $A^1$ a flywheel B and is provided at its driving end with a flange $A^2$ to which is connected by bolts $A^3$ a clutch C the detail structure of which is shown in Figures 2 and 3.

The clutch C is formed mainly of light metal having good heat conducting properties such as aluminium or magnesium alloy and comprises a casing constituted by two plate-like parts D, E separated by an annular distance piece or rim F engaging their outer edges, the three parts D, E and F of the casing being clamped together by a series of bolts $F^1$.

The part D is connected to the flange $A^2$ on the crankshaft by the bolts $A^3$ and has cast integral therewith a series of vanes $D^1$ which serve to cause a current of air to flow over the outer surface of the part D and also act as cooling fins for transmitting heat from the part D to such air. The vanes $D^1$ are conveniently enclosed by an annular cover plate or guard $D^2$ secured in place by the bolts $F^1$.

The part E of the clutch casing comprises a boss portion $E^1$ connected to a circumferential portion $E^2$ by a series of arms $E^3$ formed as vanes serving to draw air axially through the member E into the interior of the clutch casing, this air after entering the casing flowing radially out therefrom through perforations $F^2$ in the rim part F.

Extending into the clutch casing through the part E is a driven shaft G which is supported in a bearing $G^1$ in the flange $A^2$. The shaft G is splined or similarly formed and has mounted thereon so as to be capable of longitudinal but not of rotational motion relatively thereto a hub member H which carries rigidly connected thereto a plate J formed for example of steel. Each face of the plate J has riveted or otherwise connected to it adjacent to its circumference a facing of friction material $J^1$. The friction material $J^1$ on one face of the plate J is adapted to engage a steel or like facing plate K rigidly connected to the part D of the clutch casing and held in place by the bolts $F^1$, while the friction material $J^1$ on the other face of the plate J is adapted to engage a steel or like facing plate L rigidly secured to a ring M of aluminium or the like which is free to move longitudinally but not to rotate relatively to the part E and is acted upon by a series of coiled springs N extending between the ring M and the part E. The member M is formed with a series of vanes $M^1$ which in addition to assisting the flow of air radially through the clutch casing and out through the openings $F^2$ act as cooling fins to transmit heat from the member M to this air.

The springs N tend to press the plate L into engagement with the friction material $J^1$ on the adjacent face of the plate J and thereby to move the plate J longitudinally so that the friction material $J^1$ on the other face thereof engages the facing plate K. In this way the plate J is frictionally locked to the clutch casing and the clutch is thus engaged.

The mechanism whereby the disengagement of the clutch is effected may vary but in the construction shown three levers O are each pivoted at $O^1$ to lugs $E^4$ on the part E, the outer end of each lever O engaging a rim $L^1$ on the plate L while the inner end thereof engages a thrust block P. The thrust block P is adapted to be acted upon by a clutch pedal or the like through a thrust bearing $P^1$ so as to cause the levers O to move the plate L away from the plate J against the action of the springs N so as to disengage the clutch.

It will be seen that in the construction illustrated wherein the friction material is mounted on the central plate J rubbing action during the period when the clutch is being engaged takes place between this material and the steel plates K and L. The heat thus produced is transmitted directly to the parts D and M whence it is carried away by the cooling air current caused to flow over the rear face of these parts by the vanes $D^1$, $M^1$ and $E^3$. Further, owing to the superior heat conducting properties of the light alloys of which the parts D and M are formed as compared with ferrous metals, the transfer of heat from the surfaces where it is generated to the surfaces from which it is transmitted to the air current is facilitated.

It is to be understood that while the invenion has been described with particular reference to clutches of the type employing a single friction plate, clutches having more than one plate or other types of clutch may be employed without departing from this invention. Further, although in the construction illustrated the flyweel has been shown as situated in the centre of the crankshaft it may in some cases be displaced by one or more cranks towards the end thereof carrying the clutch so as to tend to equalize the natural frequencies of oscillation of the parts of the crankshaft on either side of the flywheel.

What I claim as my invention and desire to secure by Letters Patent is:—

1. A crankshaft assembly for a multi-cylinder reciprocating engine including in combination a multi-throw crankshaft, a flywheel so placed on the crankshaft that it has at least one crank on each side thereof, and a transmission clutch at the end of the crankshaft from which the drive is taken, said clutch being of light weight as compared with the weight of the flywheel whereby the presence of the clutch will not have sufficient effect on the natural frequency of torsional vibration of the crankshaft assembly to bring the same within the range of frequencies induced by the operation of the engine.

2. A crankshaft assembly for a multi-cylinder reciprocating engine including in combination a multi-throw crankshaft, a flywheel disposed intermediate the ends of the crankshaft, and a transmission clutch disposed at the end of the crankshaft from which the drive is taken, said clutch being of light weight as compared to the weight of the flywheel and said flywheel being so disposed in the length of the crankshaft that the natural frequency of oscillation of the part of the crankshaft assembly on the clutch side of the flywheel is approximately equal to that of the part of the crankshaft on the other side of the flywheel whereby the frequency of crankshaft oscillation may be maintained outside of the range of frequencies induced by the operation of the engine.

In testimony whereof I have signed my name to this specification.

HARRY RALPH RICARDO.